(12) United States Patent
Wu et al.

(10) Patent No.: US 11,432,477 B2
(45) Date of Patent: Sep. 6, 2022

(54) RADIATOR AND PLANT ILLUMINATION LAMP

(71) Applicant: FUJIAN SANAN SINO-SCIENCE PHOTOBIOTECH CO., LTD., Fujian (CN)

(72) Inventors: Chanjuan Wu, Fujian (CN); Liang Zeng, Fujian (CN); Pingqiu Lin, Fujian (CN); Nana Li, Fujian (CN)

(73) Assignee: FUJIAN SANAN SINO-SCIENCE PHOTOBIOTECH CO., LTD., Quanzhou (CN)

(*) Notice: Subject to any disclaimer, the term of this patent is extended or adjusted under 35 U.S.C. 154(b) by 0 days.

(21) Appl. No.: 17/400,111

(22) Filed: Aug. 12, 2021

(65) Prior Publication Data
US 2021/0400884 A1 Dec. 30, 2021

Related U.S. Application Data

(63) Continuation-in-part of application No. 16/348,494, filed as application No. PCT/CN2019/007092 on Jan. 9, 2019, now abandoned.

(30) Foreign Application Priority Data

Apr. 28, 2018 (CN) .......................... 201810404793.1

(51) Int. Cl.
*A01G 9/24* (2006.01)
*F21V 29/71* (2015.01)
(Continued)

(52) U.S. Cl.
CPC ............ *A01G 9/249* (2019.05); *F21V 29/713* (2015.01); *F21V 29/76* (2015.01); *A01G 7/045* (2013.01)

(58) Field of Classification Search
CPC ...... A01G 7/045; A01G 9/249; F21V 29/713; F21V 29/76
See application file for complete search history.

(56) References Cited

U.S. PATENT DOCUMENTS

2016/0273833 A1 9/2016 Haile et al.
2017/0352605 A1* 12/2017 Bilan .................. H01L 21/4871

FOREIGN PATENT DOCUMENTS

CN 201437975 U 4/2010
CN 204176603 U * 2/2015
(Continued)

OTHER PUBLICATIONS

International Search Report of PCT/CN2019/070926.
Written Opinion of PCT/CN2019/070926.

*Primary Examiner* — Rajarshi Chakraborty
*Assistant Examiner* — Nathaniel J Lee
(74) *Attorney, Agent, or Firm* — Dragon Sun Law Firm, PC; Jinggao Li, Esq.; Nathaniel Perkins

(57) ABSTRACT

A radiator and a plant illumination lamp containing the radiator. The radiator includes a heat-radiating baseplate configured for fixing a heat source, and heat-radiating side plates connected to the heat-radiating baseplate. The heat-radiating side plates each are provided with a plurality of heat-exchanging through grooves running through the heat-radiating side plates. The heat-exchanging through groove forms a heat potential difference, so that under the influence of the heat potential difference, the cold air outside the radiator passes through the heat-exchanging through groove on the heat-radiating side plates, and then flows out through a hot air chamber and an air outlet at an upper end of the hot air chamber after exchanging heat with the heat-exchanging through groove on the heat-radiating side plates, so as to form a strong natural air convection.

19 Claims, 7 Drawing Sheets

(51) Int. Cl.
*F21V 29/76* (2015.01)
*A01G 7/04* (2006.01)

(56) References Cited

FOREIGN PATENT DOCUMENTS

| | | |
|---|---|---|
| CN | 204176603 U | 2/2015 |
| CN | 204593304 U | 8/2015 |
| CN | 205026622 U | 2/2016 |
| CN | 108591883 A | 9/2018 |
| CN | 108626623 A | 10/2018 |

\* cited by examiner

RADIATOR AND PLANT ILLUMINATION LAMP

CROSS REFERENCE TO THE RELATED APPLICATIONS

This application is a continuation-in-part application of U.S. patent application Ser. No. 16/348,494, which is the national phase entry of International Application No. PCT/CN2019/070926, filed on 9, Jan. 2019, which is based upon and claims priority to Chinese Patent Application No. 201810404793.1, filed on 28, Apr. 2018, the entire contents of which are incorporated herein by reference.

TECHNICAL FIELD

The present invention relates to the field of heat radiation, and particularly to a radiator and a plant illumination lamp containing the radiator.

BACKGROUND

The plant illumination lamp, as the name implies, is a luminaire used for plants. The plant illumination lamp simulates sunlight based on the principle that plants need sunlight for photosynthesis, and provides supplementary lighting or completely replaces the sunlight for plants. Accordingly, the light source of the plant illumination lamp has a relatively larger illumination, which is several times of the illumination of the ordinary desk lamp and has a value up to several thousands. Thus, a single lamp of the plant illumination lamp has a very high power, and there is a high requirement for the heat radiation performance of the lamp.

At present, the structure of the radiator provided in the plant illumination lamp is shown in FIG. 1. The radiator 100 has a substantially U-shaped cross section, and the radiator 100 includes a heat-radiating baseplate 101 extending horizontally, heat-radiating side plates 102 configured at both ends of the heat-radiating baseplate 101 in the width direction and extending vertically. The heat-radiating baseplate 101 is connected to the lamp housing of the plant illumination lamp to perform the heat conduction, and heat is radiated through the heat-radiating baseplate 101 and the heat-radiating side plates 102.

Further, the amount of heat exchanged by the radiator is $Q=h*A*\Delta T$, where h is a heat exchange coefficient (usually ranges 4-20), A is the total area of the radiator involving in the heat exchange, and $\Delta T$ is the temperature difference between the heat source and the medium. In the radiator having the above structure, the total area A is increased with the configuration of the heat-radiating side plates 102. However, in the radiator having the above structure, the convection efficiency of the hot and cold air is very poor, and the effective heat radiation area is small, so that the heat exchange coefficient h is small. In the most cases, the heat exchange coefficient h is equal to 4 or slightly greater than 4. Therefore, the design of the radiator available now overly focuses on the total area A involving in the heat exchange while ignoring the improvement of the value of the heat exchange coefficient h. As a result, the heat radiation performance of the radiator is not the optimal, and the heat radiation requirements of the plant illumination lamp cannot be fully satisfied.

SUMMARY

In view of the above-described drawbacks of the prior art, the objective of the present invention is to provide a radiator capable of greatly increasing the value of the heat exchange coefficient h and the effective heat radiation area.

To achieve the above objective, the present invention provides a radiator, including a heat-radiating baseplate configured for fixing a heat source, and heat-radiating side plates connected to the heat-radiating baseplate. The heat-radiating side plates are provided with a plurality of heat-exchanging through grooves running through the heat-radiating side plates.

Further, the heat-radiating side plates are arranged on two sides of the heat-radiating baseplate; and the heat-radiating side plates are provided with a plurality of heat-radiating fins.

Further, the heat-radiating fins are integrally formed on the heat-radiating side plates by a punching method. After the heat-radiating side plates are punched, torn portions caused by punching and through-groove portions in a one-to-one correspondence with the torn portions are formed on the heat-radiating side plates. The torn portions form the heat-radiating fins, and the through-groove portions form the heat-exchanging through grooves.

Further, the heat-radiating fins protrude from the heat-radiating side plates, and the heat-exchanging through grooves are formed between the heat-radiating side plates and the heat-radiating fins.

Further, in the plurality of heat-radiating fins, a part of the heat-radiating fins protrude inwardly from the heat-radiating side plates, and another part of the heat-radiating fins protrude outwardly from the heat-radiating side plates.

Further, the heat-radiating fins each include a fin bottom located at a middle of the heat-radiating fin and extending straightly, and a fin slanted plate portion extending obliquely from both ends of the fin bottom. One end of the fin slanted plate portion away from the fin bottom is connected to the heat-radiating side plates. The fin bottom is in a flat plate shape or an arc plate shape.

Further, when the radiator is used in a lamp, the heat-radiating baseplate is integrally provided with a reflector. The heat-radiating baseplate and the reflector constitute a lamp housing for the lamp and form a light source cavity of the lamp.

Further, the heat-radiating side plates are integrally connected to the heat-radiating baseplate, and the radiator is an extruded aluminum profile or a bent plate.

The present application further provides a plant illumination lamp which includes a lamp housing having a light source cavity, a light source mounted in the lamp housing and located in the light source cavity, and the radiator as described above. The radiator is mounted at an upper end of the lamp housing.

Further, the lamp housing and the radiator form an integral structure from a sheet metal. The sheet metal can be from aluminum and stainless steel. The thickness of sheet metal is commonly specified by a traditional, non-linear measure known as its gauge. The larger the gauge number, the thinner the metal. The commonly used steel sheet metal can be any gauge number ranging from 30 gauge to about 7 gauge. The commonly used aluminum sheet metal can be any gauge number ranging from 40 gauge to about 7 gauge. The lamp housing and the radiator share the heat-radiating baseplate; and the light source is mounted on the heat-radiating baseplate.

As described above, according to the present invention, the radiator and the plant illumination lamp have the following advantages.

In the present application, the heat-exchanging through grooves form a heat exchange channel for the internal-andexternal temperature difference of the radiator, i.e., form a heat potential difference. As a result, the cold air outside the radiator would pass through the heat-exchanging through grooves on the heat-radiating side plates under the influence of the heat potential difference and then flow out through a hot air chamber and an air outlet mounted at an upper end of the hot air chamber after exchanging heat with the through grooves on the heat-radiating side plates, so as to form a stronger natural air convection. Therefore, the value of the heat exchange coefficient h of the radiator at the position near the heat-exchanging through grooves is improved by 4-6 times higher than that of the radiator without heat-exchanging through grooves. Moreover, the heat-exchanging through grooves increase the effective heat radiation area of the radiator during the processing, thereby greatly improving the heat radiation capability of the radiator, so that the heat radiation requirements of the plant illumination lamp can be satisfied.

Figure 1:
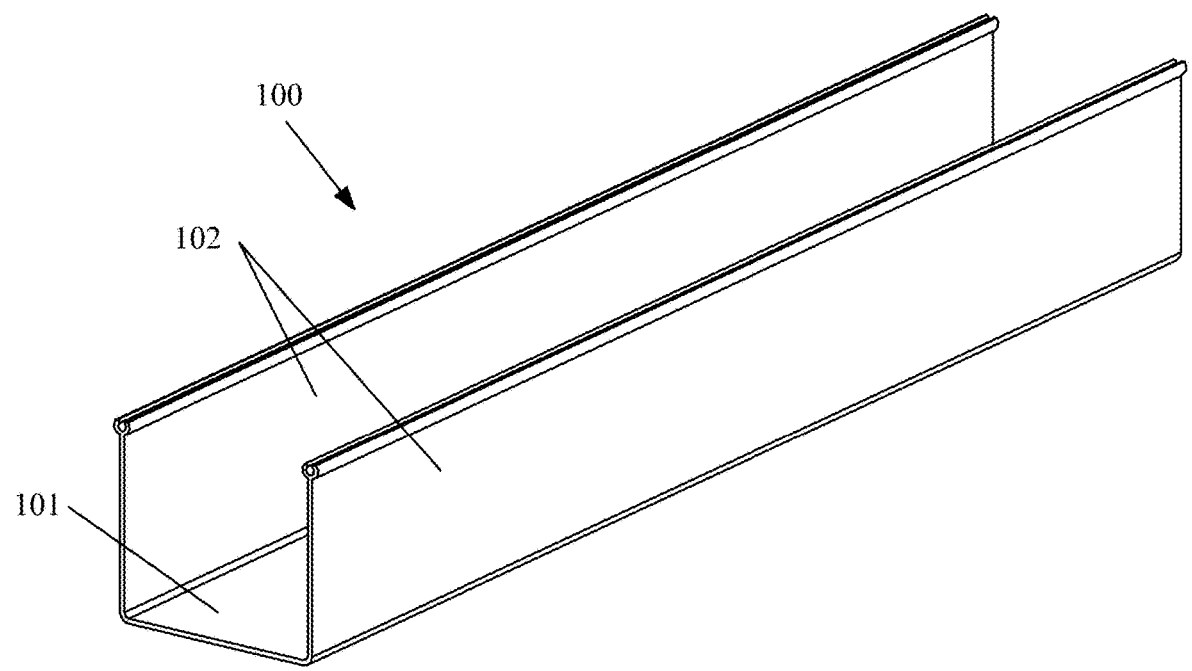
FIG. 1 is a structural schematic diagram of a radiator in the prior art.

DESCRIPTION OF THE REFERENCE DESIGNATORS OF THE COMPONENTS 1. heat-radiating baseplate;
2. heat-radiating side plate;
21. heat-exchanging through groove
22. heat-radiating fin
221. fin bottom
222. fin slanted plate portion
23. mounting groove
3. hot air chamber
4. inner cavity
5. air outlet
6. reflector
61. fixing slot
7. light source cavity
8. light source
9. lampshade
10. end cover
11. hook
12. lifting rope
13. beam
14. threaded hole

DETAILED DESCRIPTION OF THE EMBODIMENTS

The implementations of the present invention are described hereinafter through specific embodiments. Those skilled in the art can readily learn other advantages and functions of the present invention from the disclosure in the specification.

It should be noted that the structure, proportion, size, etc. depicted in the drawings of the specification are merely intended to match the contents disclosed in the specification for person familiar with this technology to understand and read, rather than to limit the implementation requirements of the present invention, and therefore have no technical significance. Any modifications of the structure, variations of the proportional relationship, or adjustments of the size not affecting the desired function and purpose of the present invention shall be considered as falling within the scope of the technical contents disclosed by the present invention. Meanwhile, the terms such as "upper", "lower", "left", "right", "middle", "one", etc. recited in the specification are merely intended to create clear description rather than limit implementable scope of the present invention. Variations or adjustments to the relative relationship, without substantial variation of the technical contents, should also be considered as falling within the implementable scope of the present invention.

For the convenience of description, in the following embodiments, the width direction of the heat-radiating baseplate 1 in the radiator is defined as the left-right direction, the length direction of the heat-radiating baseplate 1 is defined as the front-rear direction, and the thickness direction of the heat-radiating baseplate 1 is defined as the up-down direction. Moreover, the left-right direction, the front-rear direction, and the up-down direction also refer to the width direction, the length direction, and the height direction of the radiator, respectively.

Figure 2:
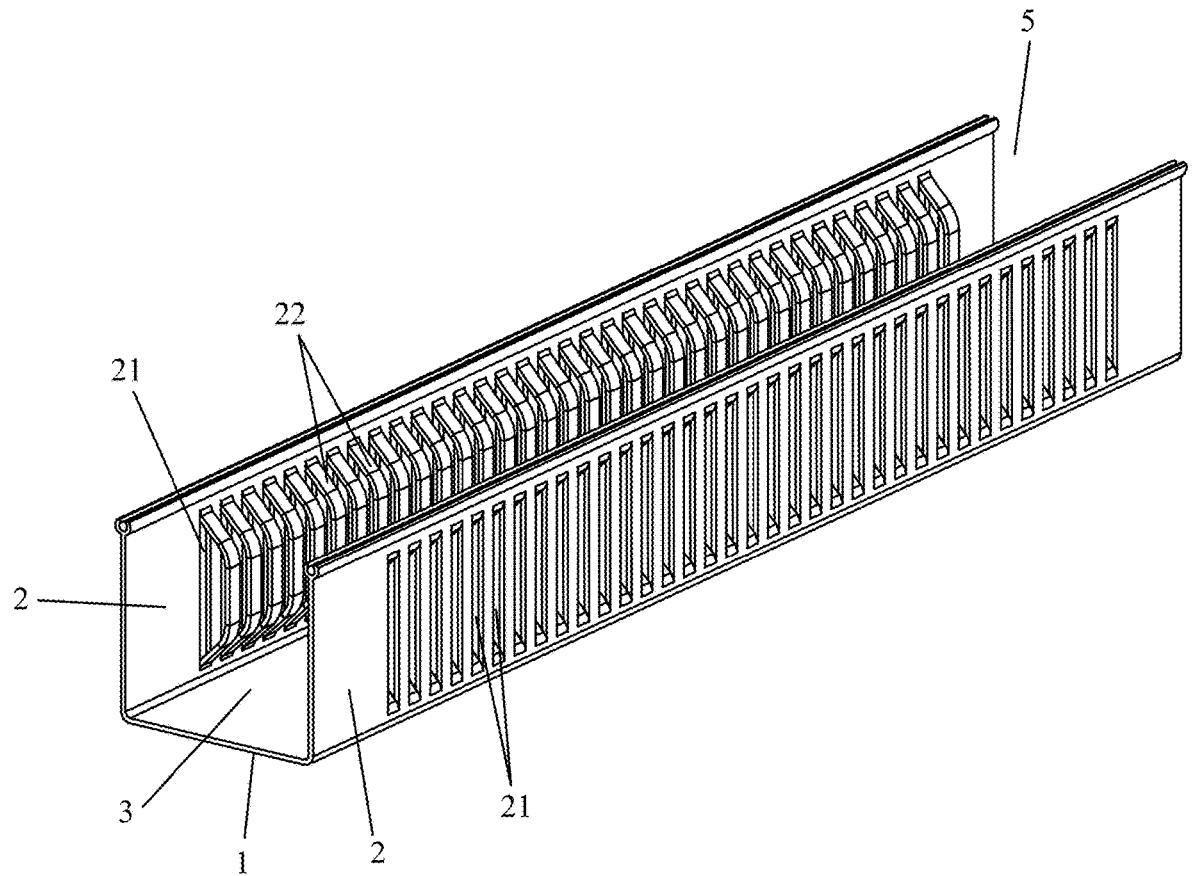
FIG. 2 is a structural schematic diagram of a radiator in the present invention.
Figure 3:
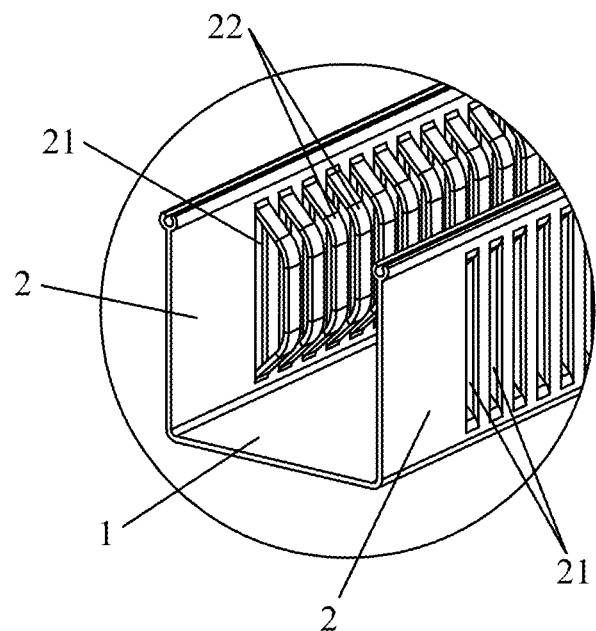
FIG. 3 is a partially enlarged view of FIG. 2.
Figure 4:
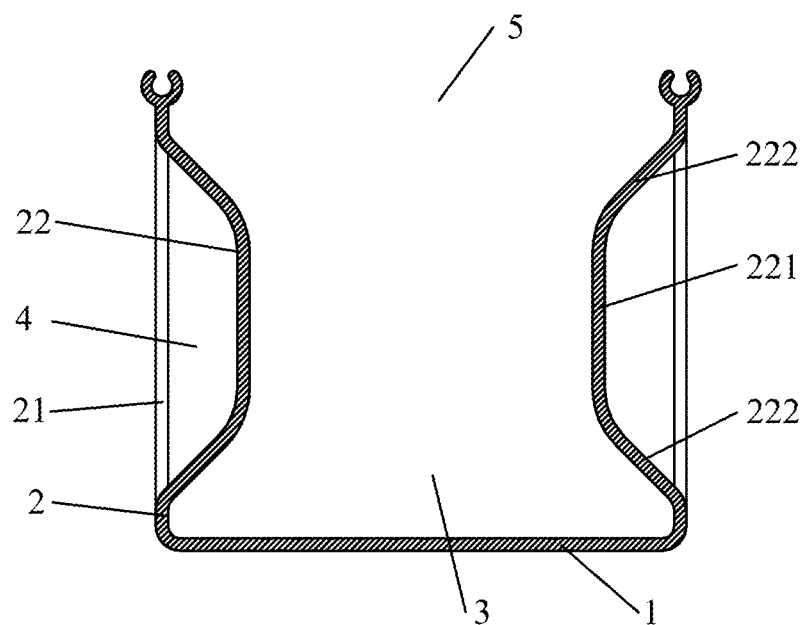
FIG. 4 is a cross-sectional view of the radiator of FIG. 2 at a position of the heat-exchanging through groove.

As shown in FIGS. 2-4, the present application provides a radiator which includes the heat-radiating baseplate 1 configured for fixing a heat source, and heat-radiating side plates 2 connected to the heat-radiating baseplate 1. The heat-radiating side plates 2 are provided with a plurality of heat-exchanging through grooves 21 running through the heat-radiating side plates 2. Preferably, the heat-radiating side plates 2 are arranged on two sides of the heat-radiating baseplate 1, particularly on the edges of the heat-radiating baseplate 1. The heat-radiating side plates 2 may extend straightly along a plane where the heat-radiating baseplate 1 is located. In this case, the heat-radiating side plates 2 and the heat-radiating baseplate 1 come from one flat plate. Or, the heat-radiating side plates 2 may extend in a direction perpendicular to the heat-radiating baseplate 1. In the radiator shown in FIGS. 2-4, the heat-radiating side plates 2 are arranged at left and right ends of the heat-radiating baseplate 1 along the width direction of the heat-radiating baseplate 1. A hot air chamber is formed between the heat-radiating baseplate 1 and the heat-radiating side plates 2. An air outlet 5 located at an upper end of the hot air chamber 3 is formed between the upper ends of the two heat-radiating side plates 2. The heat-radiating baseplate 1 extends forward and backward in a horizontal direction and is a transverse plate. The heat-radiating side plates 2 extend forward and backward in a vertical direction and are vertical plates. Specifically, a plurality of heat-exchanging through grooves 21 run through the heat-radiating side plates 2 between the left and right sides along the width direction of the heat-radiating baseplate 1, so that each of the heat-exchanging through grooves 21 communicates with the outside of the radiator and the hot air chamber 3. The heat-exchanging through grooves 21, the hot air chamber 3, and the air outlet 5 are sequentially interconnected to each other to form air convection channels of the radiator. In addition, the heat-exchanging through grooves 21 are longitudinal elongated grooves extending upward and downward, and the plurality of heat-exchanging through grooves 21 are equidistantly arranged forward and backward along the length direction of the heat-radiating side plates 2.

Figure 5:
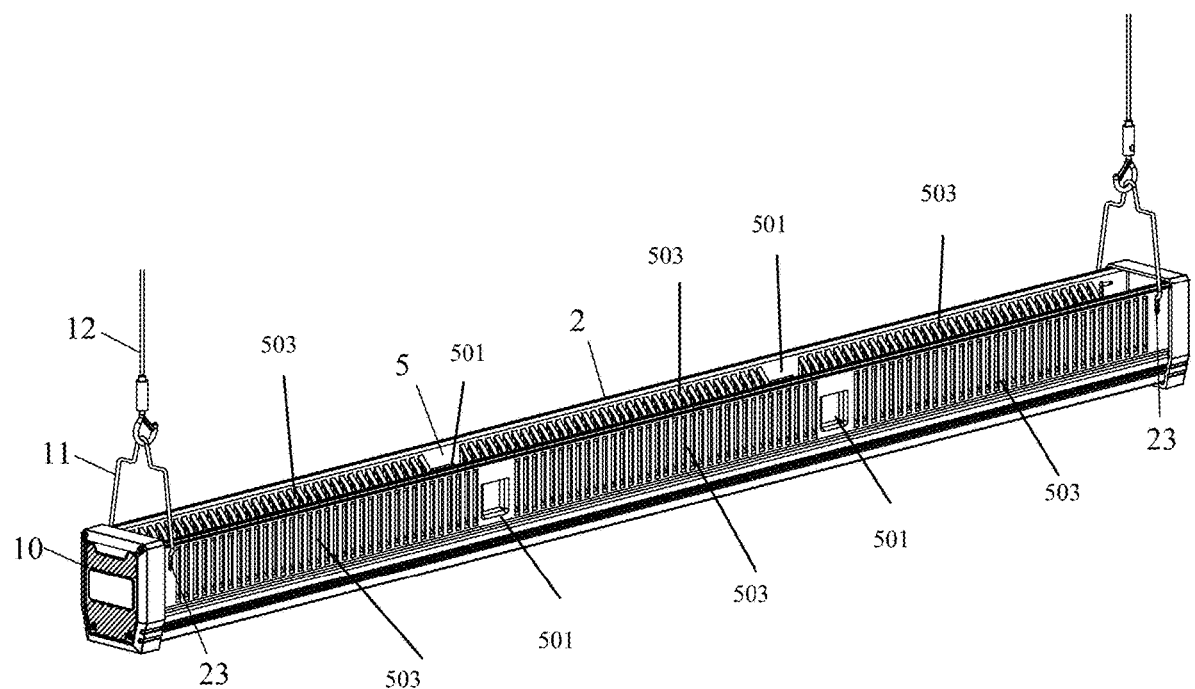
FIG. 5 is a structural schematic diagram of Embodiment 1 of the plant illumination lamp of the present application.
Figure 6:
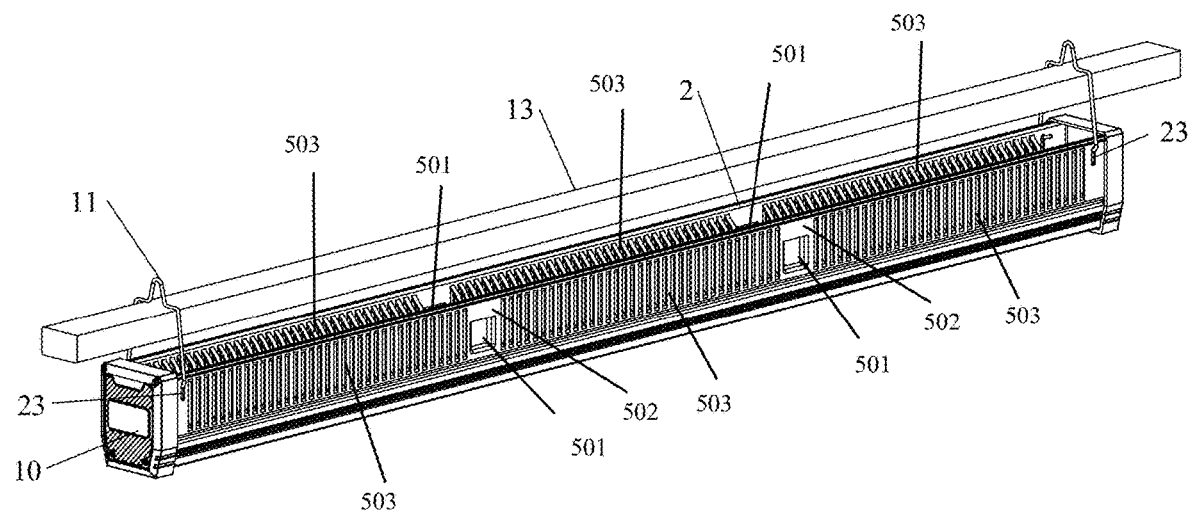
FIG. 6 is a structural schematic diagram of Embodiment 2 of a plant illumination lamp of the present application.
Figure 7:
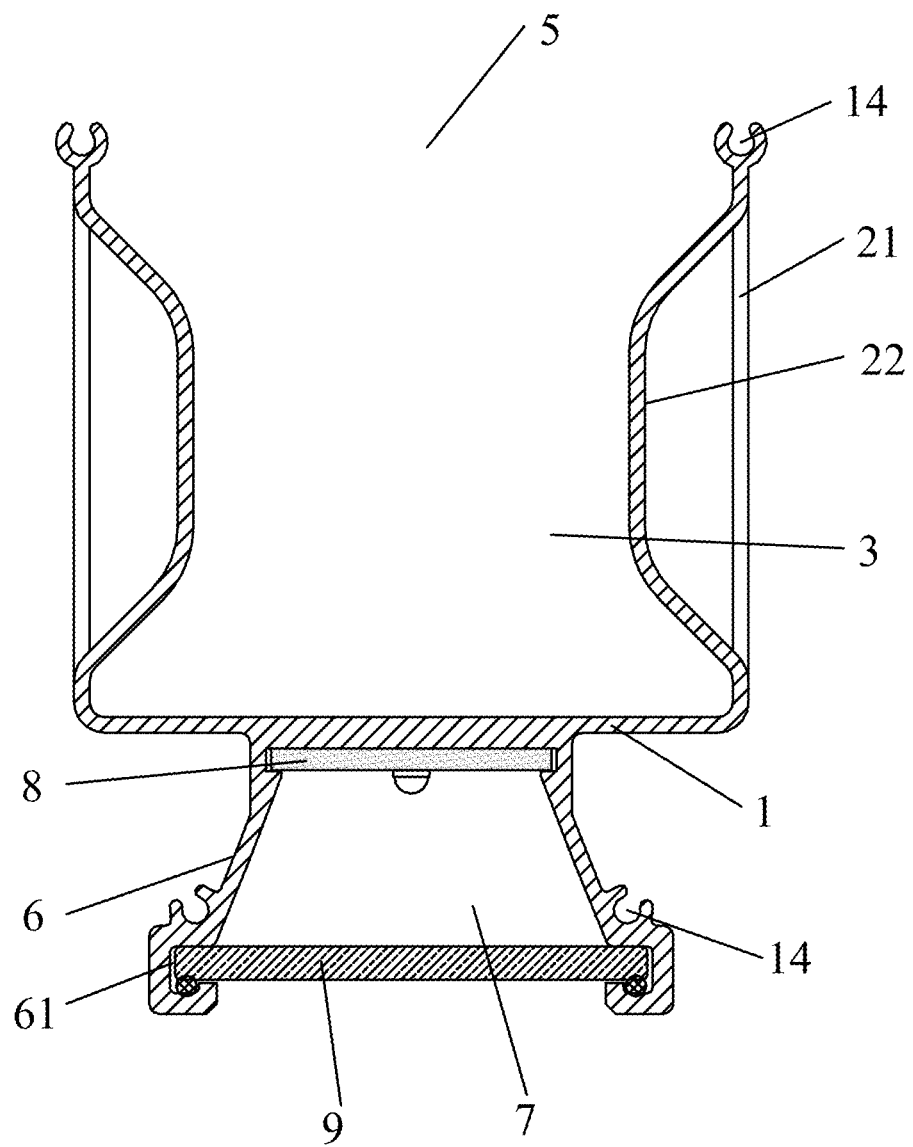
FIG. 7 is a cross-sectional view of a plant illumination lamp of the present application at a position of the heat-exchanging through groove of a radiator.

The radiator can be used in lamps, computers, or fans, etc. When the radiator is used in a lamp, the lamp may be a household lamp, a street lamp, or a plant illumination lamp, etc. As shown in FIGS. 5 and 7, or FIGS. 6 and 7, the plant illumination lamp having an elongated structure extending forward and backward includes a lamp housing, the light source 8 mounted on the lamp housing, the lampshade 9 mounted on a lower end of the lamp housing, end covers 10 mounted on the front and rear ends of the lamp housing, and the radiator as described above. The lampshade 9 may be made of transparent glass. The closed light source cavity 7 is formed by the lamp housing, the lampshade 9, and the two end covers 10. The light source 8 is located in the light source cavity 7, and the light source 8 functions as a heat source of the plant illumination lamp. The radiator is mounted on the upper end of the lamp housing.

Figure 8:
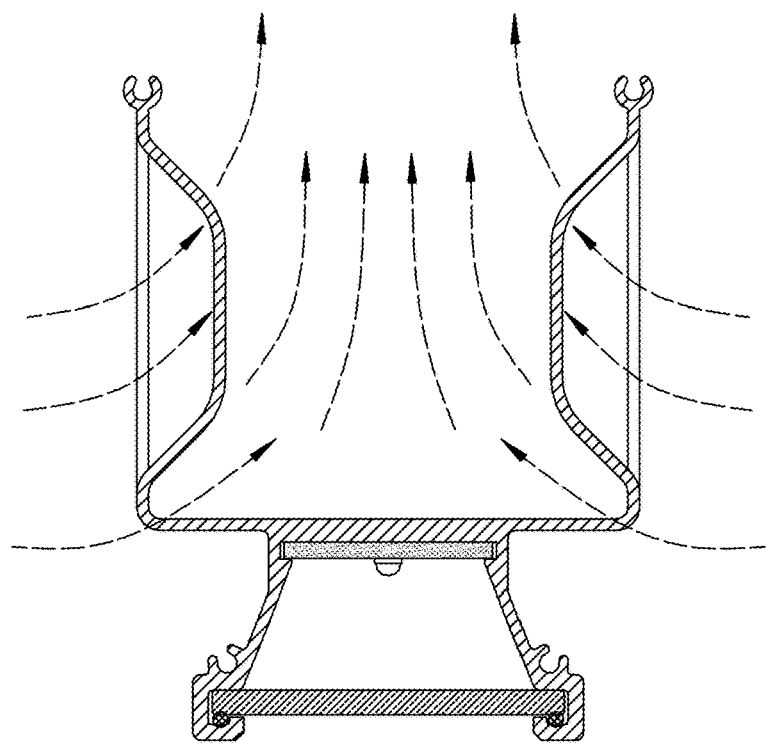
FIGS. 8-10 are schematic diagrams showing airflow of a radiator at different viewing angles.
Figure 9:
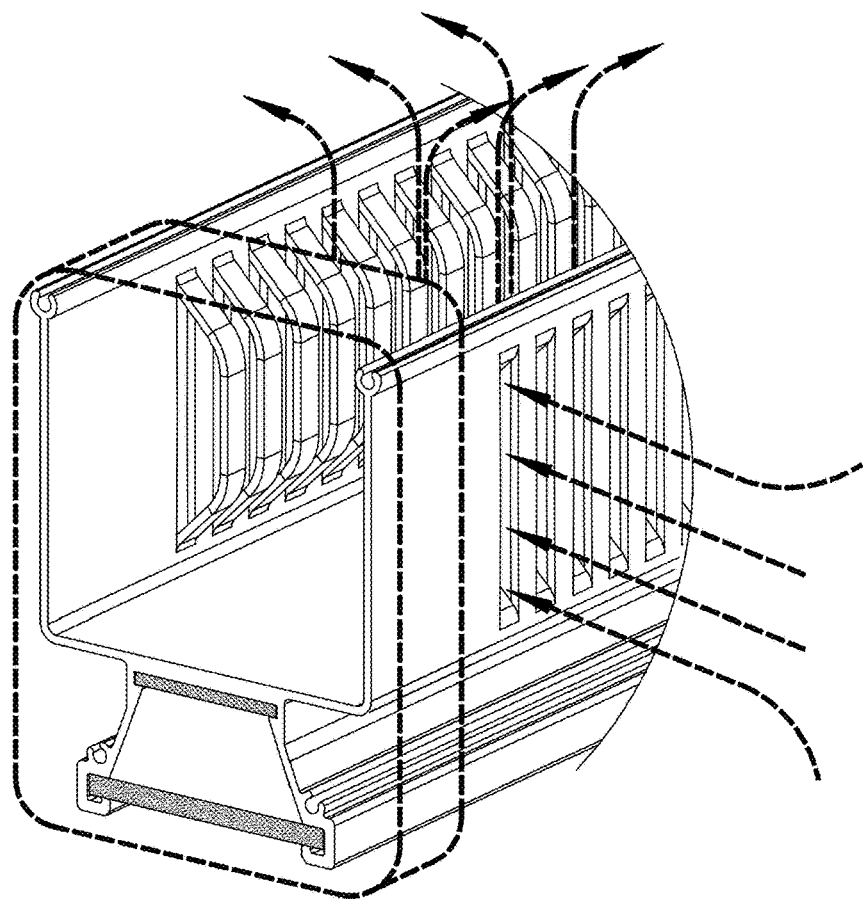
Figure 10:
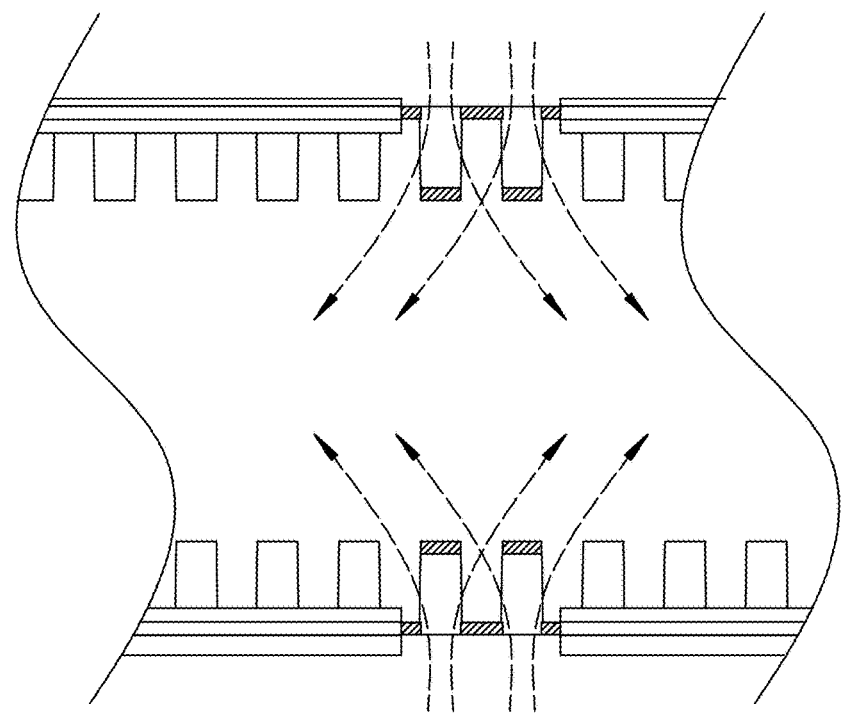

In the radiator and the plant illumination lamp containing the radiator of the present application, when the air in the hot air chamber is heated up, the heat-exchanging through groove 21 forms a heat exchange channel for the internal-and-external temperature difference of the radiator, i.e., forms a heat potential difference. As a result, under the influence of the heat potential difference, the cold air outside the radiator passes through the heat-exchanging through grooves 21 on the heat-radiating side plates 2 to exchange heat with the hot air in the hot air chamber 3 inside the radiator. As shown in FIGS. 8-10, the cold air outside the radiator passes through the radiator via the heat-exchanging through groove 21 and flows into the hot air chamber 3 for supplement and exchanging heat with the heat-exchanging through groove 21 on the heat-radiating side plates 2. The air then flows out through the hot air chamber 3 and an air outlet 5 mounted at an upper end of the hot air chamber 3 to form a strong natural air convection. The cold air from the outside is continuously fed, the hot air from the interior is continuously discharged, and the circulation of the air takes away the heat in the hot air chamber 3. Therefore, the heat-exchanging through groove 21 provides a good channel for the cold air entering the radiator, and the convection efficiency of the hot and cold air near the heat-exchanging through groove 21 of the radiator is very high. Thus, the value of the heat exchange coefficient h of the heat-exchanging through groove 21 of the radiator is improved to 4-6 times higher than that of the radiator without heat-exchanging through groove. Moreover, the heat-exchanging through groove increases the effective heat radiation area of the radiator during the processing, and thus increases the amount of heat Q exchanged by the radiator, thereby greatly improving the heat radiation capability of the radiator and meeting the heat radiation requirements of the plant illumination lamp.

Figure 11:
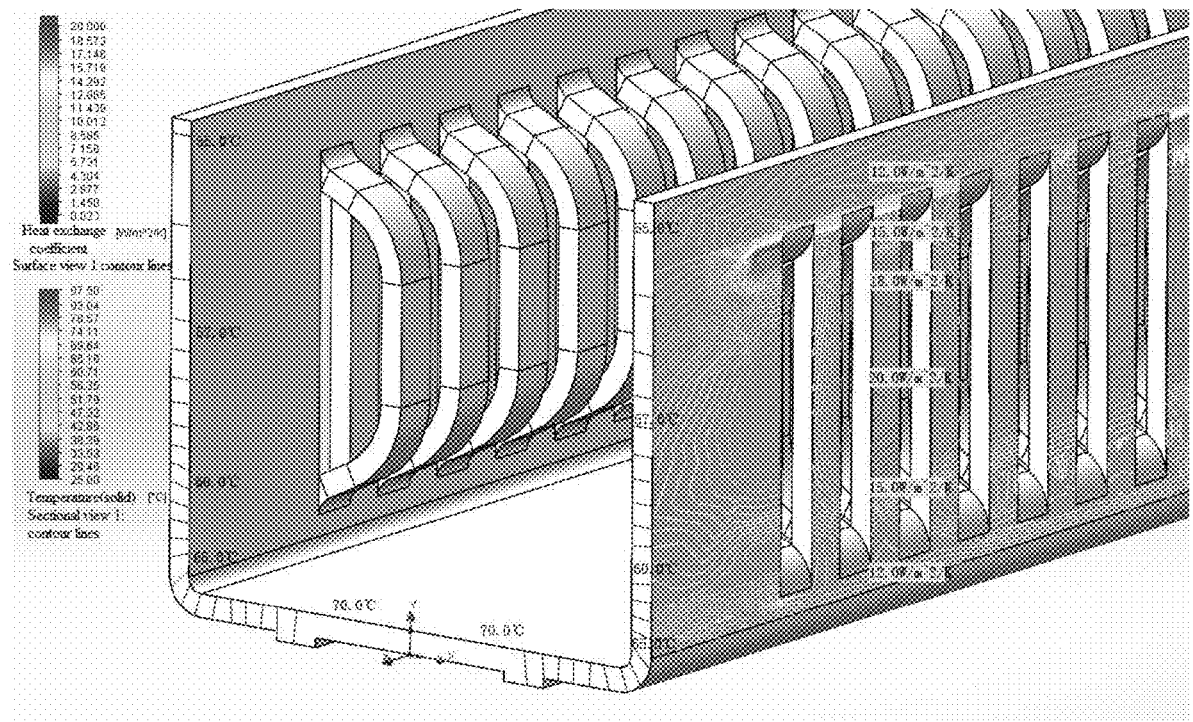
FIG. 11 is a diagram showing the comparison of heat exchange coefficient and temperature of a radiator of the present application.
Figure 12:
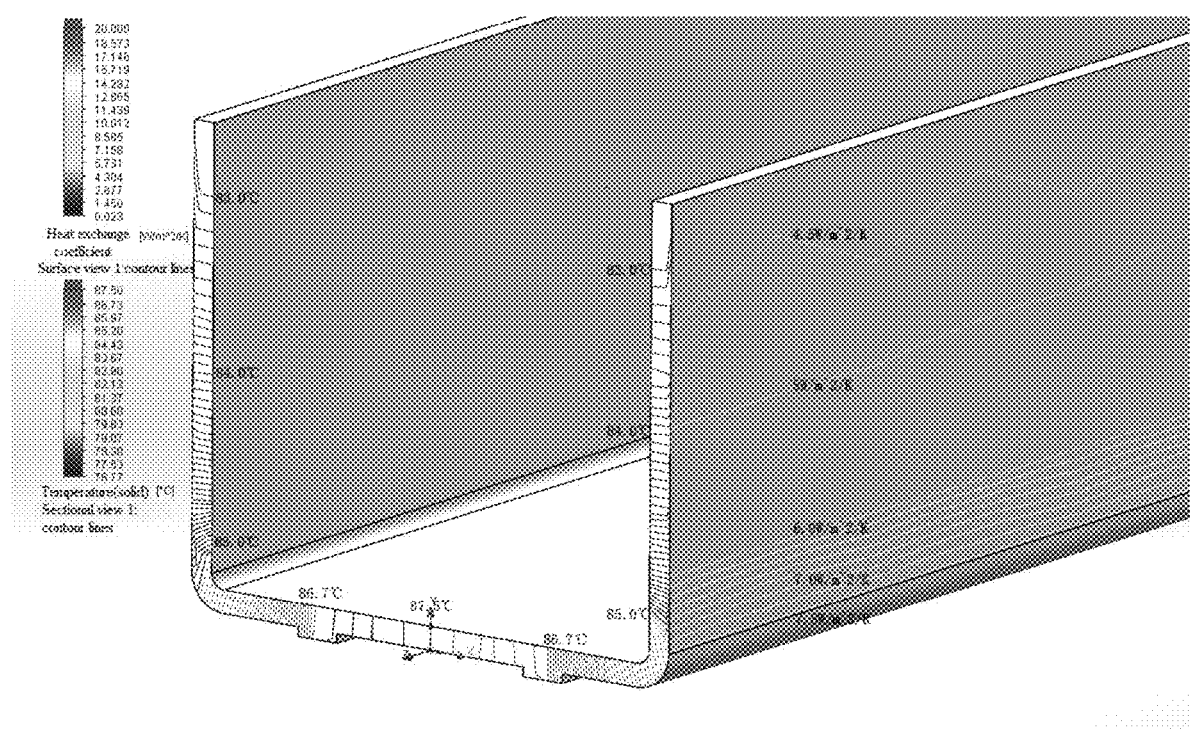
FIG. 12 is a diagram showing the comparison of heat exchange coefficient and temperature of a radiator of the prior art.

Further, the heat-radiating side plates 2 of the radiator is integrally connected to the heat-radiating baseplate 1 for fixing the light source. The heat-radiating baseplate 1 and the heat-radiating side plates 2 constitute a radiator body having a U-shaped structure. The radiator body can be formed by extrusion or by a bending method, and the length of the radiator body can be cut according to actual demands. As shown in FIGS. 3 and 4, each heat-radiating side plate is provided with a plurality of heat-radiating fins 22. Each of the heat-radiating fins 22 is a longitudinal elongated structure extending upward and downward. The plurality of heat-radiating fins 22 are equidistantly arranged with a predetermined interval along the length direction of the heat-radiating side plates 2, so the heat-radiating fins 22 can increase the heat radiation surface area of the radiator, which facilitates the heat radiation. Preferably, the heat-radiating fins 22 are formed on the heat-radiating side plates 2 by a punching method, so that the heat-radiating fins 22 and the heat-radiating side plates 2 form an integral structure. Moreover, after being punched, the heat-radiating side plates 2 each forms torn portions caused by punching and through-groove portions in one-to-one correspondence with the torn portions. The torn portions form the heat-radiating fins 22, and the through-groove portions form the heat-exchanging through grooves 21. Adopting this structure, the following advantages can be obtained. 1. The heat-radiating fins 22 and the radiator body form an integral structure to facilitate the heat conduction, so the heat emitted by the heat source is transmitted to the heat-radiating fins 22 with a minimum thermal resistance along the longitudinal direction. 2. The longitudinal heat-radiating fins 22 are formed by the punching process and the longitudinal heat-exchanging through grooves 21 are in one-to-one correspondence with the longitudinal heat-radiating fins 22. In one aspect, a new heat exchange surface is formed on the offset surface at the heat-exchanging through grooves 21, which increases the heat radiation area without increasing the use of any material, so the material cost and weight of the radiator are not increased. In the other aspect, the longitudinally punched end faces form a heat potential difference through the heat-exchanging through grooves 21, so as to provide a good channel for external cold air to pass through the radiator. The external cold air is driven by the thermal force to flow and circulate in the channel formed by heat-exchanging through grooves 21 in an unimpeded manner, forming a strong natural air convection, and thereby effectively increasing the value of the heat exchange coefficient h of the radiator. The value of the heat exchange coefficient h can be increased to 12, 15 or above. Moreover, the external cold air and the heat-radiating fins 22 have a large contact area, which increases the effective heat radiation area of the radiator, and achieves the heat radiation capability for a higher power with limited materials. More specifically, FIG. 11 shows the comparison of heat exchange coefficient and temperature of the radiator having the heat-exchanging through grooves 21 and the heat-radiating fins 22 in the present application. FIG. 12 shows the comparison of heat exchange coefficient and temperature of a radiator without the heat-exchanging through grooves 21 and the heat-radiating fins 22 in the prior art. Comparing FIG. 11 with FIG. 12, it can be seen that, in the case where the heat sources have the same power and the radiators have the same size, compared with the radiator not provided with the heat-exchanging through grooves 21 and the heat-radiating fins 22, the heat exchange coefficient and temperature of the radiator provided with the heat-exchanging through grooves 21 and the heat-radiating fins 22 are significantly different. In this Embodiment, the power of the heat source is 200 W, and the outer dimension of the radiator is 60 mm width*50 mm height*1200 mm length, and the wall thickness of the radiator is 2.5 mm.

Further, when performing the punching process to form the heat-radiating fins 22, the heat-radiating side plates 2 may be punched inwardly to form the heat-radiating fins 22, or the heat-radiating side plates 2 may be punched outwardly to form the heat-radiating fins 22. When the heat-radiating side plates 2 are punched inwardly to form the heat-radiating fins 22, as shown in FIGS. 3 and 4, the heat-radiating fins 22 protrude inwardly from the heat radiation side plates 2 and are located inside the heat-radiating side plates 2, so the heat-radiating fins 22 are also located at the inner side of the hot air chamber 3. In this case, the heat-exchanging through grooves 21 are formed between the heat-radiating fins 22 and the heat-radiating side plates 2. An inner cavity 4 intercommunicated in front and rear sides that communicates with the hot air chamber 3 is formed between the heat-radiating fins 22 and the heat-radiating side plates 2. The heat-exchanging through grooves 21 communicate with the hot air chamber 3 through the inner cavity 4. The direction of air convection is as follows. As shown in FIGS. 8-10, the external cold air flows into the hot air cavity 3 after successively passing through the heat-exchanging through grooves 21 and the inner cavity 4 from different directions, and the air after heat exchange flows out from the air outlet 5 at the upper end of the hot air chamber 3, so as to provide a high cooling efficiency. When the heat-radiating side plates 2 are punched outwardly to form the heat-radiating fins 22, the heat-radiating fins 22 protrude outwardly from the heat radiation side plates 2 and are located at the outer side the heat-radiating side plates 2. The heat-exchanging through grooves 21 are formed between the heat-radiating fins 22 and the heat-radiating side plates 2. An outer cavity intercommunicated in front and rear sides that communicates with the outside of the radiator is formed between the heat-radiating fins 22 and the heat-radiating side plates 2. The outer cavity communicates with the hot air chamber 3 through the heat-exchanging through grooves 21. The direction of air convection is as follows. The external cold air flows into the hot air cavity 3 after successively passing through the outer cavity and heat-exchanging through grooves 21 from different directions, and the air after heat exchange flows out from the air outlet 5 at the upper end of the hot air chamber 3, so as to provide a high cooling efficiency. Among the plurality of heat-radiating fins 22 of the heat-radiating side plates 2, the plurality of heat-radiating fins 22 may all protrude inwardly from the heat-radiating side plates 2, may all protrude outwardly from the heat-radiating side plates 2, or may partially protrude inwardly from the heat-radiating side plates 2 and partially protrude outwardly from the heat-radiating side plates 2, simultaneously. In addition, a preferred structure of the heat-radiating fins 22 is described as follows. As shown in FIG. 4, the heat-radiating fins 22 each includes the fin bottom 221 located in a middle and extending straightly, and the fin slanted plate portion 222 extending obliquely from both ends of the fin bottom 221. One end of the fin slanted plate portion 222 away from the fin bottom 221 is connected to the heat-radiating side plates 2. The fin bottom 221 has a flat plate shape, an arc plate shape, or other shape, which can effectively increase the heat radiation surface area of the heat-radiating fins 22 and facilitate the heat radiation.

In order to achieve the effective heat radiation of the radiator, the plant illumination lamp provided with the radiator should be installed in a suspended manner, so that the upper part of the hot air chamber 3 in the radiator is suspended to form an air circulation channel. The suspended installation of the plant illumination lamp can be achieved through mounting slots 23 provided on the heat-radiating side plates 2 and additional hooks 11. Two preferred embodiments are listed below. Embodiment 1: as shown in FIG. 5, the front and rear ends of the heat-radiating side plates 2 are provided with mounting slots 23 intercommunicated in front and rear sides. Two hooks 11 are provided and are respectively connected to the mounting slots 23 at the front and rear ends of the radiator. The upper ends of the hooks 11 are connected to lifting ropes 12, and the lifting ropes 12 can be connected to the ceiling to realize a non-ceiling-mounted installation of the plant illumination lamp. Embodiment 2: as shown in FIG. 6, the front and rear ends of the heat-radiating side plates 2 are provided with mounting slots 23 intercommunicated in front and rear sides. Two hooks 11 are provided and are respectively connected to the mounting slots 23 at the front and rear ends of the radiator. The hooks 11 are hang on the beam 13 or a frame, and there is a space left between the beam 13 and the radiator or between the frame and the radiator to achieve a non-ceiling-mounted installation of the plant illumination lamp. The above two structures make the installation and disassembly of plant illumination lamp very convenient and easy to operate. As shown in FIGS. 5 and 6, each of the two heat-radiating side plates 2 is provided with three pluralities of heat-exchanging through grooves 503 running through the each of the two heat-radiating side plates 2, and two openings 501 are located on exterior side walls 502 of the each of the two heat-radiating side plates 2 and are disposed in alternative ways with the three pluralities of heat-exchanging through grooves 503. Two opening 501 are cut through the exterior side walls 502. Two cut-through openings 501 can be two air outlets for heat exchange. Each of cut-through openings 501 has a square shape.

The heat-radiating baseplate, the two heat radiating side plates and the two reflectors are an integral structure from a single aluminum sheet metal. The sheet metal can be an aluminum sheet metal or stainless sheet metal.

Each of the two heat radiating side plates are perpendicular or substantially perpendicular to the heat-radiating baseplate; each of the two heat radiating side plates are parallel or substantially parallel to the each other; each of the plurality of heat-radiating fins that are integrally formed on the heat-radiating side plates are parallel or substantially parallel to each other and are perpendicular or substantially perpendicular to one of the two heat radiating side plates; the heat-radiating baseplate, the two heat radiating side plates form a U-shaped structure; and the hook is a U-shaped structure facing downward.

The integral structure is provided with four threaded holes 14 extending forward and backward, so that the integral structure is connected to four corners of the two end covers via the four threaded holes 14. The four threaded holes can extend through the whole length of the side plate. Two threaded holes are located on two end of the heat-radiating fins; two other threaded holds are located on the outer end of the reflector extending forward and backward.

Each of the two heat-radiating side plates is provided with three pluralities of heat-exchanging through grooves running through the each of the two heat-radiating side plates, and two air outlets are located on exterior side walls of the each of the two heat-radiating side plates and are disposed in alternative ways with the three pluralities of heat-exchanging through grooves.

Further, as shown in FIG. 7, the lamp housing and the radiator in the plant illumination lamp form an integral structure. In one embodiment, the integral structure is from an aluminum sheet metal or stainless sheet metal. The lamp housing and the radiator share the heat-radiating baseplate 1.

The light source 8 is mounted on a lower end surface of the heat-radiating baseplate 1 and facing downwards, and the hot air chamber 3 is formed above the upper surface of the heat-radiating baseplate 1, which greatly reduces the thermal resistance and facilitates the heat radiation. A preferred structure of the lamp housing is as follows. The lamp housing is integrally provided with two reflectors 6 arranged symmetrically at the left and right on the heat-radiating baseplate 1, and the two reflectors 6 both extend forward and backward. The inner surface of the reflector 6 is provided with the fixing slot 61, and the left and right edges of the lampshade 9 are respectively fixed in the fixing slots 61 of the two reflectors 6, thereby realizing the connection between the lampshade 9 and the lamp housing. In addition, a seal ring mounted in the fixing slot 61 is provided between the lampshade 9 and the reflector 6 for waterproofing. A mounting cavity intercommunicated in front and rear sides is formed among the heat-radiating baseplate 1, the reflector 6, and the lampshade 9. The two end covers 10 respectively seal and block the front and rear ends of the mounting cavity to form the closed light source cavity 7. The end covers 10 are fixed on the heat-radiating side plate 2 and the reflector 6 by screws, so the upper end of the heat-radiating side plate 2 and the outer end of the reflector 6 are provided with threaded holes 14 extending forward and backward. The components integrally formed by the radiator and the lamp housing are extruded aluminum profiles or bent plates, which can realize a complicated mounting structure on a single piece of radiator 12, so as to reduce the problems of large thermal resistance and high failure risk caused by multi-part assembly. Therefore, the products have the advantages of better strength, lighter piece weight, and lower cost.

In summary, according to the radiator of the present application, the extruded aluminum profiles are subjected to the process of punching to form the heat-radiating fins 22 and the heat-exchanging through grooves 21, which can greatly increase the value of the heat exchange coefficient h and the effective heat-radiating area, using a small amount of material without increasing the material cost and product weight, thereby greatly improving the heat-radiating capability of the radiator.

Therefore, the present invention effectively overcomes various drawbacks in the prior art and has high industrial utilization value.

The above-described embodiments merely exemplify the principles and functions of the present invention and are not intended to limit the present invention. Various modifications or variations of the above-described embodiments may be made by those skilled in the art without departing from the spirit and scope of the present invention. Therefore, all equivalent modifications or variations made by those of ordinary skill in the art without departing from the spirit and technical idea of the present invention should be covered by the appended claims of the present invention.

What is claimed is:

1. A radiator, comprising:
   (1) a heat-radiating baseplate configured for fixing a heat source, and
   (2) two heat-radiating side plates connected to the heat-radiating baseplate, wherein each heat-radiating side plate is provided with a plurality of heat-radiating fins that are integrally formed on the heat-radiating side plates, wherein the radiator is used for a lamp, the lamp comprising:
   two hooks each having two legs that are provided and are respectively connected to four mounting slots located on exterior side walls of front and rear ends of the two heat-radiating side plates, wherein upper ends of the hooks are connected to lifting ropes that can be connected to a ceiling;
   the heat-radiating baseplate is integrally provided with a reflector; and the heat-radiating baseplate and the reflector constitute a lamp housing of the lamp and form a light source cavity for the lamp, wherein each of two reflectors comprises a reflecting surface facing downwards; and the lamp comprises a lampshade, a light source, two end covers and the radiator; and the radiator is mounted at an upper end of the lamp housing;
   the light source is located in the light source cavity and mounted on a lower end surface of the heat-radiating baseplate,
   the lampshade is mounted on a lower end of the lamp housing; and
   the two end covers are mounted on the front and rear ends of the lamp housing; and
   the light source cavity is further formed by the lamp housing, the lampshade, and the two end covers;
   the heat-radiating baseplate, the two heat radiating side plates and the two reflectors are an integral structure from a single aluminum sheet metal;
   the integral structure is provided with four threaded holes extending forward and backward so that the integral structure is connected to four corners of the two end covers via the four threaded holes; two threaded holes are located on two ends of the plurality of heat-radiating fins and two other threaded holds are located on outer ends of the two reflectors extending forward and backward; and
   each of the two heat-radiating side plates is provided with three pluralities of heat-exchanging through grooves running through the each of the two heat-radiating side plates, and two air outlets are located on exterior side walls of the each of the two heat-radiating side plates and are disposed in alternative ways with the three pluralities of heat-exchanging through grooves.

2. The radiator according to claim 1, wherein the two heat-radiating side plates are arranged on two sides of the heat-radiating baseplate; and the each heat-radiating side plate is provided with a plurality of heat-radiating fins.

3. The radiator according to claim 2, wherein the plurality of heat-radiating fins are integrally formed on the each heat-radiating side plate by a punching method, and after being punched, the two heat-radiating side plates are configured with torn portions caused by punching and through-groove portions in a one-to-one correspondence with the torn portions; and the torn portions form the plurality of heat-radiating fins, and the through-groove portions form the heat-exchanging through grooves.

4. The radiator according to claim 3, wherein the plurality of heat-radiating fins protrudes from the two heat-radiating side plates, and the heat exchange through grooves are formed between the two heat-radiating side plates and the plurality of heat-radiating fins.

5. The radiator according to claim 4, wherein among the plurality of heat-radiating fins, a part of the heat-radiating fins protrudes inwardly from the two heat-radiating side plates, and another part of the heat-radiating fins protrude outwardly from the two heat-radiating side plates.

6. The radiator according to claim 5, wherein each heat-radiating fin—comprises a fin bottom located in a middle and extending straightly, and a fin slanted plate portion—extending obliquely from both ends of the fin bottom; one end of the fin slanted plate portion away from the fin bottom is connected to the two heat-radiating side plates; and the fin bottom is in a flat plate shape or an arc plate shape.

7. The radiator according to claim 6, wherein the heat-radiating side plates are integrally connected to the heat-radiating baseplate, and the radiator is an extruded aluminum profile or a bent plate.

8. The radiator according to claim 7, wherein the two heat-radiating side plates are integrally connected to the heat-radiating baseplate, and the radiator is an extruded aluminum profile or a bent plate.

9. The radiator according to claim 7, wherein the two reflectors are arranged symmetrically at the left and right on the heat-radiating baseplate, and the two reflectors both extend forward and backward; the inner surface of each of the two reflector is provided with fixing slots, and the left and right edges of the lampshade are respectively fixed in the fixing slots of the two reflectors, thereby realizing the connection between the lampshade and the lamp housing.

10. The radiator according to claim 9, wherein each of the two heat radiating side plates are perpendicular or substantially perpendicular to the heat-radiating baseplate; each of the two heat radiating side plates are parallel or substantially parallel to the each other; each of the plurality of heat-radiating fins that are integrally formed on the heat-radiating side plates are parallel or substantially parallel to each other and are perpendicular or substantially perpendicular to one of the two heat radiating side plates; the heat-radiating baseplate, the two heat radiating side plates form a U-shaped structure; and the hook is a U-shaped structure facing downward.

11. The radiator according to claim 5, wherein each heat-radiating fin comprises a fin bottom located in a middle and extending straightly, and a fin slanted plate portion extending obliquely from both ends of the fin bottom; one end of the fin slanted plate portion away from the fin bottom is connected to the two heat-radiating side plates; and the fin bottom is in a flat plate shape or an arc plate shape.

12. The radiator according to claim 4, wherein each heat-radiating fin comprises a fin bottom located in a middle and extending straightly, and a fin slanted plate portion extending obliquely from both ends of the fin bottom; one end of the fin slanted plate portion away from the fin bottom is connected to the two heat-radiating side plates; and the fin bottom is in a flat plate shape or an arc plate shape.

13. The radiator according to claim 3, wherein each heat-radiating fin comprises a fin bottom located in a middle and extending straightly, and a fin slanted plate portion extending obliquely from both ends of the fin bottom; one end of the fin slanted plate portion away from the fin bottom is connected to the two heat-radiating side plates; and the fin bottom is in a flat plate shape or an arc plate shape.

14. The radiator according to claim 2, wherein the plurality of heat-radiating fins are integrally formed on the each heat-radiating side plate by a punching method; the lamp housing and the radiator are in an integral structure; the lamp housing and the radiator share the heat-radiating baseplate; and the light source is mounted on the heat-radiating baseplate; and the two heat-radiating side plates are integrally connected to the heat-radiating baseplate, and the radiator is an extruded aluminum profile or a bent plate.

15. A plant illumination lamp, comprising: a lamp housing having a light source cavity, a light source mounted in the lamp housing and located in the light source cavity, and a radiator comprising (1) a heat-radiating baseplate configured for fixing a heat source, and (2) two heat-radiating side plates connected to the heat-radiating baseplate, two hooks each having two legs that are provided and are respectively connected to four mounting slots located on exterior side walls of the front and rear ends of the two heat-radiating side plates, wherein the two hooks are hang on a beam and there is a space left between the beam and the radiator or between the frame and the radiator to achieve a non-ceiling-mounted installation of the lamp;

wherein each of the two heat-radiating side plates is provided with three pluralities of heat-exchanging through grooves running through the each of the two heat-radiating side plates, and the radiator is mounted at an upper end of the lamp housing, wherein each of two reflectors comprises a reflecting surface facing downwards; and the lamp comprises a lampshade, a light source, two end covers and the radiator, wherein the radiator is mounted at an upper end of the lamp housing;

the light source is located in a light source cavity and mounted on a lower end surface of the heat-radiating baseplate;

the lampshade is mounted on a lower end of the lamp housing; and the two end covers are mounted on the front and rear ends of the lamp housing;

the light source cavity is formed by the lamp housing, the lampshade, and the two end covers;

the heat-radiating baseplates, the heat radiating baseplate and the two reflectors are an integral structure from an aluminum sheet metal;

the integral structure is provided with four threaded holes extending forward and backward so that the integral structure is connected to four corners of the two end covers via the four threaded holes; two threaded holes are located on two ends of the plurality of heat-radiating fins and two other threaded holds are located on outer ends of the two reflectors extending forward and backward;

each of the two heat-radiating side plates is provided with three pluralities of heat-exchanging through grooves running through the each of the two heat-radiating side plates, and two air outlets are located on the exterior side walls of the each of the two heat-radiating side plates and are disposed in alternative ways with the three pluralities of heat-exchanging through grooves.

16. The plant illumination lamp according to claim 15, wherein the lamp housing and the radiator are in an integral structure; the lamp housing and the radiator share the heat-radiating baseplate; and the light source is mounted on the heat-radiating baseplate.

17. The plant illumination lamp according to claim 16, wherein the lamp housing and the radiator are in an integral structure; the lamp housing and the radiator share the heat-radiating baseplate; and the light source is mounted on the heat-radiating baseplate; and the two heat-radiating side plates are integrally connected to the heat-radiating baseplate, and the radiator is an extruded aluminum profile or a bent plate.

18. The plant illumination lamp of claim 17, wherein the two reflectors are arranged symmetrically at the left and right on the heat-radiating baseplate, and the two reflectors both extend forward and backward; the inner surface of each of the two reflector is provided with fixing slots, and the left and right edges of the lampshade are respectively fixed in the fixing slots of the two reflectors, thereby realizing the connection between the lampshade and the lamp housing.

19. The plant illumination lamp of claim 18, wherein each of the two heat radiating side plates are perpendicular or substantially perpendicular to the heat-radiating baseplate;

each of the two heat radiating side plates are parallel or substantially parallel to the each other; each of the plurality of heat-radiating fins that are integrally formed on the heat-radiating side plates are parallel or substantially parallel to each other and are perpendicular or substantially perpendicular to one of the two heat radiating side plates; the heat-radiating baseplate, the two heat radiating side plates form a U-shaped structure; and the hook is a U-shaped structure facing downward.

\* \* \* \* \*